2,960,434

15-HYDROXY-PROGESTERONE AND DERIVATIVES THEREOF

Eugene L. Dulaney, Saskatoon, Saskatchewan, Canada, and William J. McAleer, Roselle, and Thomas H. Stoudt, Westfield, N.J., assignors to Merck & Co., Inc., Rahway, N.J., a corporation of New Jersey No Drawing. Filed Dec. 27, 1955, Ser. No. 555,278

5 Claims. (Cl. 195—51)

This invention relates to a process for preparing 15-hydroxy-progesterone and esters thereof.

This application is a continuation-in-part of our copending application Serial No. 480,067 filed January 5, 1955, now abandoned.

The compounds prepared by the present invention can be represented by the following structural formula:

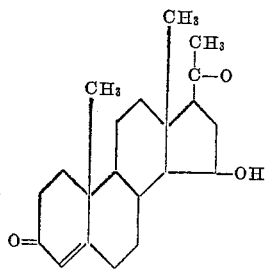

These compounds have cortisone-like activity and are therefore useful in a manner similar to cortisone.

In accordance with the invention, the epimeric 15-hydroxy-progesterone are prepared by subjecting progesterone to a fermentation process by means of an oxygenating strain of hypholma (NRRL 2471) or *Bacillus megaterium* (NRRL B938) or to oxygenating enzymes produced by these microorganisms.

The fermentation of progesterone to produce 15-hydroxy-progesterone is conveniently carried out by subjecting the progesterone to the action of an oxygenating enzyme produced by growing an oxygenating strain of Hypholoma or *B. megaterium*. This is accomplished by growing the microorganism under aerobic conditions in a suitable nutrient medium in intimate contact with the progesterone; the culturing growth of the microorganism being continued until the oxygenation has occurred. Alternately, the process is effected by the use of homogenized resting cells by first growing the microorganism in a suitable fermentation medium under aerobic conditions, and then separating the cells from the fermentation medium and adding the progesterone to these resting cells and continuing the aerobic conditions for sufficient time to effect the desired oxygenation.

The progesterone can be added to the nutrient medium as a suspension in a suitable solvent such as water, as a solution in a solvent such as acetone, propylene glycol, dimethylformamide or dimethylacetamide, or in a finely divided form such as a solid micronized powder. In general, it is desirable that the progesterone be present in very finely divided form in order to permit maximum contact with the oxygenating culture medium and insure completion of the reaction. All of the progesterone may be added at one time or the addition may be continuous or intermittent over a period of time.

The process can be effected in both stationary and submerged cultures of Hypholoma or *B. megaterium* under aerobic conditions, although for practical purposes it is most conveniently carried out by growing the microorganism under submerged conditions in a suitable aqueous fermentation medium containing the progesterone. The amount of the progesterone which can be conveniently oxygenated, will depend in part upon the particular medium employed.

Aqueous nutrient mediums suitable for the growing of oxygenating strains of the microorganisms must contain sources of assimilable carbon and nitrogen as well as minor amounts of inorganic salts. Any of the usual sources of assimilable carbon such as dextrose, cerelose, glucose, inverted molasses, and the like, employed in fermentation mediums can be used in carrying out the process of our invention. Similarly, complex sources of nitrogen usually employed in commercial fermentation process such as lactalbumin digest ("Edamine") and corn steep liquor, or inorganic sources of nitrogen such as dibasic ammonium phosphate, ammonium nitrate, and the like, are satisfactory for use in the fermentation mediums. Minor amounts of other substances such as nicotinamide or inorganic salts, such as suitable soluble salts of magnesium, zinc, potassium, sodium, phosphorous, and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in our process of oxygenating progesterone:

Medium No. 1

| | |
|---|---:|
| Commercial dextrose (cerelose) g | 50.00 |
| Commercial lactalbumin digest (Edamine) g | 20.00 |
| Corn steep liquor g | 5.00 |

Distilled water is added to give a total volume of 1 liter of nutrient medium and the pH adjusted to 6.5 with sodium hydroxide.

Medium No. 2

| | |
|---|---:|
| Inverted black strap molasses g | 100.00 |
| Commercial lactalbumin digest (Edamine) g | 20.00 |
| Corn steep liquor g | 5.00 |

Distilled water is added to give a total volume of 1 liter of nutrient medium and the pH adjusted to 6.5 with sodium hydroxide.

Medium No. 3

| | |
|---|---:|
| Inverted black strap molasses g | 100.00 |
| Corn steep liquor g | 5.00 |

Distilled water is added to give a total volume of 1 liter of nutrient medium and the pH adjusted to 6.5 with sodium hydroxide.

Medium No. 4

| | |
|---|---:|
| Inverted black strap molasses g | 100.00 |
| Corn steep liquor g | 20.00 |

Distilled water is added to give a total volume of 1 liter of nutrient medium and the pH adjusted to 6.5 with sodium hydroxide.

Medium No. 5

| | |
|---|---|
| Inverted black strap molasses _____ g__ | 50.00 |
| Corn steep liquor _____ g__ | 6.3 |

Distilled water is added to give a total volume of 1 liter of nutrient medium and the pH adjusted to 6.5 with sodium hydroxide.

Medium No. 6

| | |
|---|---|
| Glucose (sterilized separately) _____ g__ | 50.0 |
| $NaNO_3$ _____ g__ | 3.0 |
| $K_2HPO_4$ _____ g__ | 1.0 |
| $MgSO_4$ _____ g__ | 0.5 |
| KCl _____ g__ | 0.5 |
| $FeSO_4 7H_2O$ _____ g__ | 0.01 |

Distilled water is added to give a total volume of 1 liter of nutrient medium and the pH adjusted to 6.5 with sodium hydroxide.

Medium No. 7

| | |
|---|---|
| Sucrose _____ g__ | 50.0 |
| $NH_4NO_3$ _____ g__ | 5.0 |
| $MgSO_4$ _____ g__ | 5.0 |
| $K_2HPO_4$ _____ g__ | 6.5 |
| $ZnSO_4 7H_2O$ _____ g__ | 0.05 |
| $FeCl_3 6H_2O$ _____ g__ | 0.08 |

Distilled water is added to give a total volume of 1 liter of nutrient medium and the pH adjusted to 6.5.

The addition of minor amounts of anti-foaming agents, although not essential, is desirable with some fermentation mediums. It has been found that the addition to certain fermentation mediums of a substituted oxazoline which is a nonvolatile, amine-type, cationic surface active agent available under the trade name Alkaterge C is particularly effective in reducing the amount of foam, although other antifoam agents known to be useful for this purpose can also be used.

When the oxygenation is complete, the oxygenated steroid may be recovered from the fermentation broth by extraction with a suitable water immiscible organic solvent for the oxygenated steroids. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the desired oxygenated steroid can then be evaporated to yield the desired product which may be further purified by recrystallization or other procedures conventional in the art.

The following examples are given for the purpose of illustration:

EXAMPLE 1

Approximately 3.2 liters of a culture medium having the composition described as Medium No. 1, is sterilized for 30 minutes at 100° C. The medium is then inoculated with approximately 125 ml. of a growth of a strain of B. megaterium NRRL B938. The mixture is then agitated using a two turbo agitator at 408 r.p.m. and air is passed in at a rate of two liters per minute for approximately 24 hours while maintaining the temperature at 28° C. At the end of the 24 hour period approximately 0.8 g. of progesterone dissolved in 100 ml. of propylene glycol was added to the fermented medium and agitation and aeration continued at the same rate. The resulting broth is filtered and the cells reserved for further treatment, is extracted with three 1.5 liter portions of n-propyl acetate. The combined extracts are washed with one liter of 3% sodium bicarbonate and one liter of water and concentrated to dryness in vacuo (broth extract).

The broth extract containing the 15-hydroxy-progesterone is chromatographed on silica gel. The five 100 ml. fractions which were eluted with 2% methanol in chloroform were evaporated to dryness leaving as a residue a crude material containing the product. This material was dissolved in ethyl acetate and subjected to paper strip chromatography in the system benzene/formamide. The major component, with an Rf=0.58 was eluted from the paper with methanol. The methanol solution was evaporated and the partially purified product which remained was partitioned between water and chloroform. The chloroform phase which contained the product was separated and dried over sodium sulfate. The chloroform solution was filtered to remove the sodium sulfate and the filtrate containing the product evaporated to remove the chloroform and leave the partially purified product as a solid residue. This partially purified product was crystallized from ethyl acetate, M.P. 190–200° C. Recrystallization from ethyl acetate yielded substantially pure 15-hydroxy-progesterone, M.P. 203–205° C., $[\alpha]_D + 155°$ C.

The 15-hydroxy-progesterones of the present invention demonstrate inhibitory properties in estrogenic, glucocorticoid, folliculoid, luteoid, testoid, hypertensive, salt retention as exhibited by desoxycorticosterone, spermatogenic, and progesterone activities.

EXAMPLE 2

In the same manner as described in Example 1, 0.8 g. of progesterone was added to a growing culture of a strain of fungi identified as Hypholoma (NRRL 2471). Aeration and agitation was then continued for 24 hours.

The fermented medium containing the steroid was then sterilized and filtered to remove the mycelial growth. The filtrate was extracted with three 1.5 liter portions of chloroform. The chloroform extracts were combined and successively washed with water, dilute aqueous sodium bicarbonate solution and water, then separated and dried over sodium sulfate. The sodium sulfate was removed by filtration and the filtrate evaporated to remove the chloroform leaving the steroidal product as a crude residue. This residual material was crystallized from ethyl acetate. Crude crystals containing 15-hydroxy-progesterone were obtained, M.P. 190–210° C. Recrystallized from ethyl acetate, M.P. 220–226° C.

The crystalline material obtained in this manner was dissolved in chloroform and chromatographed over silica gel. Fractions eluted with 5% methanol in chloroform were evaporated to obtain a partly purified crystalline fraction containing 15-hydroxy-progesterone. This crystalline material was dissolved in benzene and rechromatographed over a solka-floc column saturated with benzene-formamide. The partition chromatogram was developed with benzene and 25 cc. fractions were collected. Fractions 14–31 were combined, evaporated to yield a crystalliine residue which was partitioned between water and chloroform. The chloroform extract was separated and the chloroform removed by evaporation leaving 15-hydroxy progesterone as residual crystalline solid. This crystalline solid was crystallized from ethyl acetate to give substantially pure 15-hydroxy-progesterone, M.P. 226–231° C., $[\alpha]_D + 221°$ C.

*Analysis.*—Calc. 76.32; H, 9.15. Obs. 76.66; H, 9.14.

Any departure from the above description which conforms to the present invention, is intended to be included within the scope of the claims.

What is claimed is:

1. A process which comprises subjecting progesterone under aerobic conditions to the action of an oxygenating enzyme produced by an oxygenating strain of a microorganism of the genus Hypholoma designated as NRRL 2471 to produce 15-hydroxy-progesterone having a melting point of 226–231° C. and recovering the 15-hydroxy-progesterone so formed.

2. A process for producing 15-hydroxy-progesterone having a melting point of about 203–205° C. which comprises subjecting progesterone, under aerobic conditions, to the action of an oxygenating enzyme produced by an oxygenating strain of a microorganism of the species B.

*megaterium* and recovering the 15-hydroxy-progesterone so formed.

3. A process which comprises subjecting progesterone under aerobic conditions to the action of an oxygenating enzyme produced by an oxygenating strain of a microorganism of the species *B. megaterium* designated as NRRL B938 to produce 15-hydroxy-progesterone having a melting point of 203–205° C. and recovering the 15-hydroxy-progesterone so formed.

4. A process for producing 15-hydroxy-progesterone having a melting point of about 203–205° C. which comprises growing an oxygenating strain of a microorganism of the species *B. megaterium* under aerobic conditions in an aqueous medium comprising progesterone and assimilable sources of carbon and nitrogen and recovering the 15-hydroxy-progesterone so formed.

5. A process for producing 15-hydroxy-progesterone having a melting point of about 226–231° C. which comprises growing an oxygenating strain of a microorganism of the genus Hypholoma designated as NRRL 2471 under aerobic conditions in an aqueous medium comprising progesterone and assimilable sources of carbon and nitrogen and recovering the 15-hydroxy-progesterone so formed.

References Cited in the file of this patent
UNITED STATES PATENTS 2,753,290    Fried et al. _____ July 3, 1956